United States Patent [19]

Twisselmann et al.

[11] Patent Number: 5,582,075
[45] Date of Patent: Dec. 10, 1996

[54] DOUBLE-COUNTERPOISED FLYWHEEL FOR AN INTERNAL COMBUSTION ENGINE

[75] Inventors: Hark Twisselmann; Wolfgang Hanke, both of Heidenheim, Germany

[73] Assignee: J.M. Voith GmbH, Heidenheim, Germany

[21] Appl. No.: 420,133

[22] Filed: Apr. 11, 1995

[30] Foreign Application Priority Data

Apr. 13, 1994 [DE] Germany .................. 44 12 723.5

[51] Int. Cl.⁶ .................................................. G05G 1/00
[52] U.S. Cl. .............................. 74/572; 74/573 R; 74/574; 464/68; 192/207
[58] Field of Search ................... 74/572, 573 R, 74/574; 192/106.2; 464/66–69

[56] References Cited

U.S. PATENT DOCUMENTS

| 2,714,538 | 8/1955 | Hornbostel ........................ 384/505 |
|---|---|---|
| 2,986,432 | 5/1961 | Schlauch ........................ 384/548 |
| 5,052,244 | 10/1991 | Kamiya et al. ................ 192/106.2 X |
| 5,156,249 | 10/1992 | Friedmann ........................ 192/106.2 |
| 5,307,710 | 5/1994 | Feldhaus et al. ................ 464/68 X |
| 5,367,921 | 11/1994 | Fukushima ........................ 74/574 |
| 5,384,948 | 1/1995 | Bonfilio et al. ................ 74/574 X |
| 5,435,783 | 7/1995 | Röhrle ........................ 464/68 |
| 5,471,896 | 12/1995 | Schierling et al. ................ 74/572 X |

FOREIGN PATENT DOCUMENTS

| 0599082 | 6/1994 | European Pat. Off. ........... 74/574 |
|---|---|---|
| 3448480 | 10/1993 | Germany ........................ F16D 3/14 |
| 4-113049 | 4/1992 | Japan ........................ 74/574 |

*Primary Examiner*—Vinh T. Luong
*Attorney, Agent, or Firm*—Baker & Daniels

[57] ABSTRACT

A double-counterpoised flywheel for an internal combustion engine. A counterweight is disposed on the engine side and another counterweight is disposed on the transmission side, both counterweights allowing limited mutual rotation through the intermediary of elastic members. A damping system is arranged between the two counterweights and parallel to the elastic members. The two counterweights bear on each other radially and axially through an antifriction bearing. The inner race of the antifriction bearing is mounted between a stop face of the primary mass and a holder disk that is secured to the end face of the primary mass on the power take-off side. The holder disk is provided with at least two pins which are created by driving them out of the material of the holder disk ("part-shearing") toward one and the same side of the holder disk. The end face of the hub of the primary mass is provided with holes for receiving the pins, which pins are pinch-fitted into the holes.

6 Claims, 4 Drawing Sheets

DOUBLE-COUNTERPOISED FLYWHEEL FOR AN INTERNAL COMBUSTION ENGINE

BACKGROUND OF THE INVENTION

The invention concerns a double-counterpoised flywheel for an internal combustion engine. Such a double-counterpoised flywheel includes a counterweight on the engine side and a counterweight on the transmission side. The counterweights allow limited mutual rotation through the intermediary of elastic members. A damping system is arranged between the two counterweights, and parallel to the elastic members. The two counterweights bear on each other radially and axially through an antifriction bearing. The inner race of the antifriction bearing is mounted between a stop face of a counterweight, and a holder disk secured to the end face of the counterweight on the power take-off side. In this regard, reference is made to DE 34 48 480 C2.

Double-counterpoised flywheels are accessory components for automobiles, serving to enhance travel comfort by extensively precluding rotary oscillations from being transmitted from the engine to the transmission. In this role, a perfect technical function is demanded of them. But at the same time they are a mass-produced article. A low-cost of manufacture is important in the hotly contested accessory business. In such manufacture, perfect operation must always be guaranteed.

One of the sensitive spots of double-counterpoised flywheels is the bearing and its environs. In the categorical double-counterpoised flywheel, primary mass and secondary mass bear on each other through the intermediary of a single bearing. Therefore, particular significance attaches to this bearing. Its positioning and fixing are decisive for the perfect operation and long service life of the entire assembly.

The known embodiments leave much to be desired with regard to the fixing and positioning of the inner race of the bearing. In the categorical, prior double-counterpoised flywheel, the inner race of the sole bearing is mounted between a stop face machined on the primary mass and extending in axially perpendicular fashion, and the holder disk. In turn, the holder disk is screw-joined to the double-counterpoised flywheel—and to its hub. However, this embodiment is expensive. For instance, the holder disk must be provided with screw holes, which holes are countersunk for flat head screws. The hub of the primary mass needs to be provided with matching tapped holes for receiving the countersunk screws. Maximum care must be extended to the correct positioning of the holes and of the tapped holes aligned on them. This is expensive, thus boosting the cost of production. Manufacturing inaccuracies may cause problems, which in unfavorable cases may impair the service life of the bearing and thus of the entire assembly.

The problem underlying the invention is to design a double-counterpoised flywheel in such a manner that the manufacturing costs can be reduced with respect to design and mounting of the holder disk, the service life of the assembly will be improved, and the functioning of the assembly remains perfect nonetheless.

SUMMARY OF THE INVENTION

This problem is solved by the features of the present invention. In the inventive double-counterpoised flywheel, the holder disk is provided with at least two pins, which are created by driving them out of the material of the holder disk (i.e. "part-shearing") toward one and the same side of the holder disk. The end face of the hub of the primary mass is provided with holes for receiving the pins, which pins are pinch-fitted into the holes.

The inventors have recognized that the so-called "part-shearing", can be employed favorably in the present case. The achievable tolerances are higher by a power of ten than in the known screw-joining. Inaccuracies which of necessity are associated with making screw joints are precluded. The cumbersome and potentially inaccurate countersinking for the flat heads of the screws is eliminated entirely. An optimal manufacturing accuracy is thus achievable.

In addition, the cost of such a "part-shearing" joint is considerably lower than that of known screw joints. It is significant that the pins generated by parts shearing are obtained in the same operation, along with providing in the holder disk those holes which are needed for through bolts to secure the primary mass to the crankshaft. The disk is machined using a precision cutter while simultaneously pressing the mounting pins. This results in accuracies in the range of hundredths of a millimeter.

Basically, the holes in the hub, for receiving the pins of the disk, may be through holes, but blind holes are preferred. The only requirement with blind holes is making sure that a vent exists between the interior of the blind hole and its surroundings. In the absence of such a vent, the air enclosed in the blind hole expands during operation and acts unfavorably on the end face of the pin.

The part-shearing joint of the present invention is much more favorable than a screw joint. Also, it is far superior to riveting.

BRIEF DESCRIPTION OF THE DRAWINGS

The invention is more fully explained with the aid of the drawings, wherein.

DETAILED DESCRIPTION OF THE INVENTION

Figure 1:
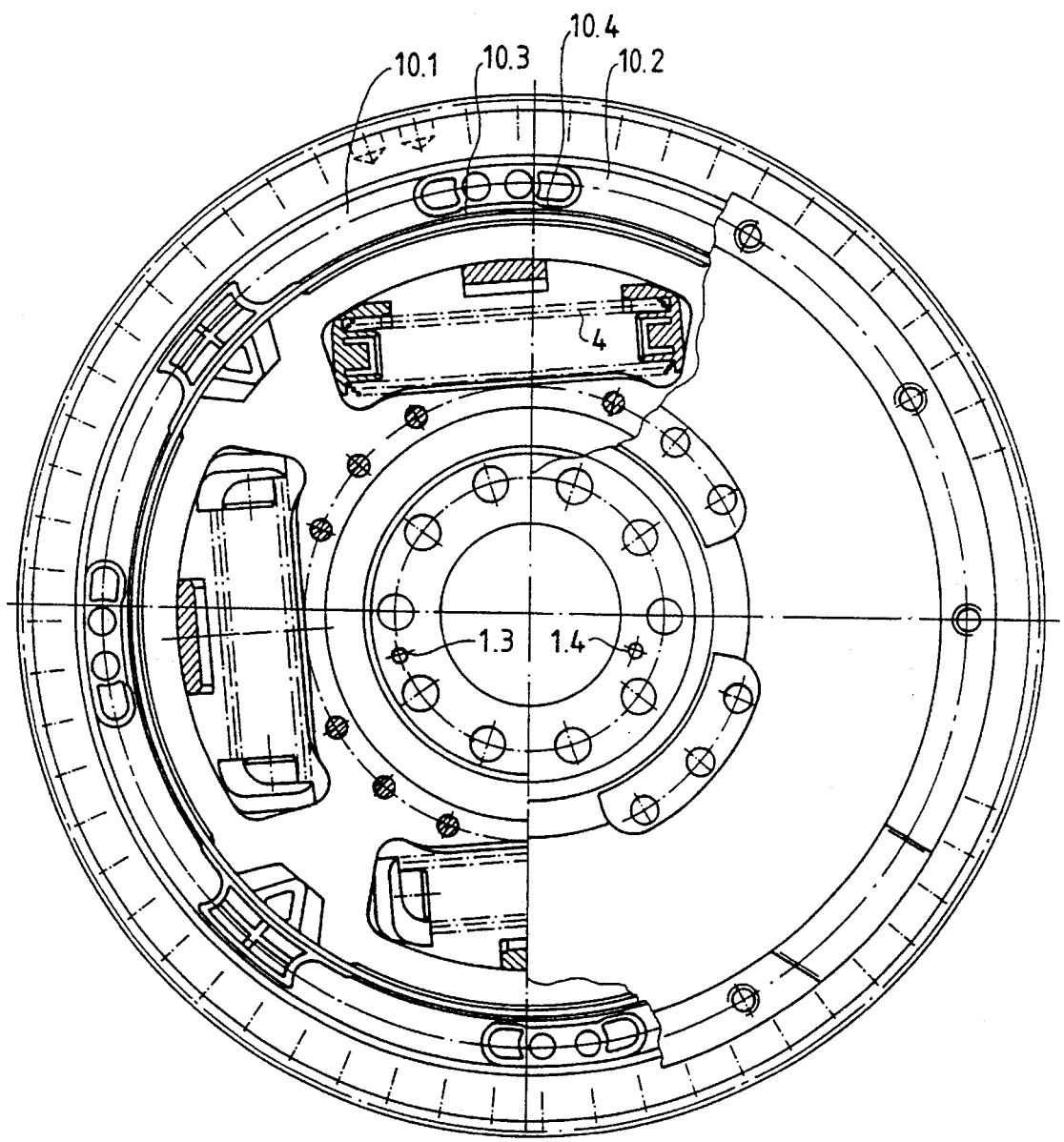
FIG. 1 shows a plan view of an inventional double-counterpoised flywheel, viewed from the engine side, partly cut away and in cross section.

As shown in the drawings, a counterweight (primary mass) 1 on the engine side interacts with a counterweight (secondary mass) 2 on the transmission side. The two counterweights 1, 2 are joined by means of an intermediate flange 3. A rotationally elastic joint is established between the primary mass 1 and the intermediate flange 3, by helical springs 4, in the radially outer area. These are arranged at least approximately on one and the same radius. A rotationally fixed joint (that is, a positive joint) is established in the radially inner area between the intermediate flange 3 and the secondary mass 2 by rivets 5.

The two counterweights 1,2 bear radially and axially on each other through a single antifriction bearing 6. The inner race 6.1 of the bearing, for one, rests on an axially perpendicular stop face 1.1 of the primary mass 1 and, for another, on the peripheral area of a holder disk 7.

Figure 2:
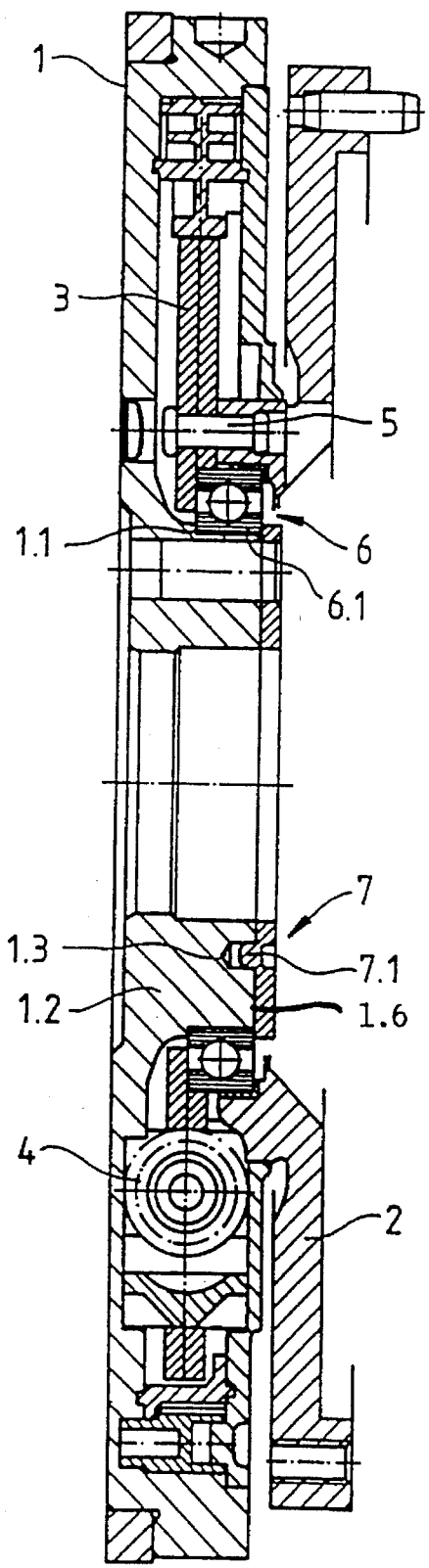
FIG. 2 shows an embodiment of the double-counterpoised flywheel of the present invention in axial section.
Figure 4:
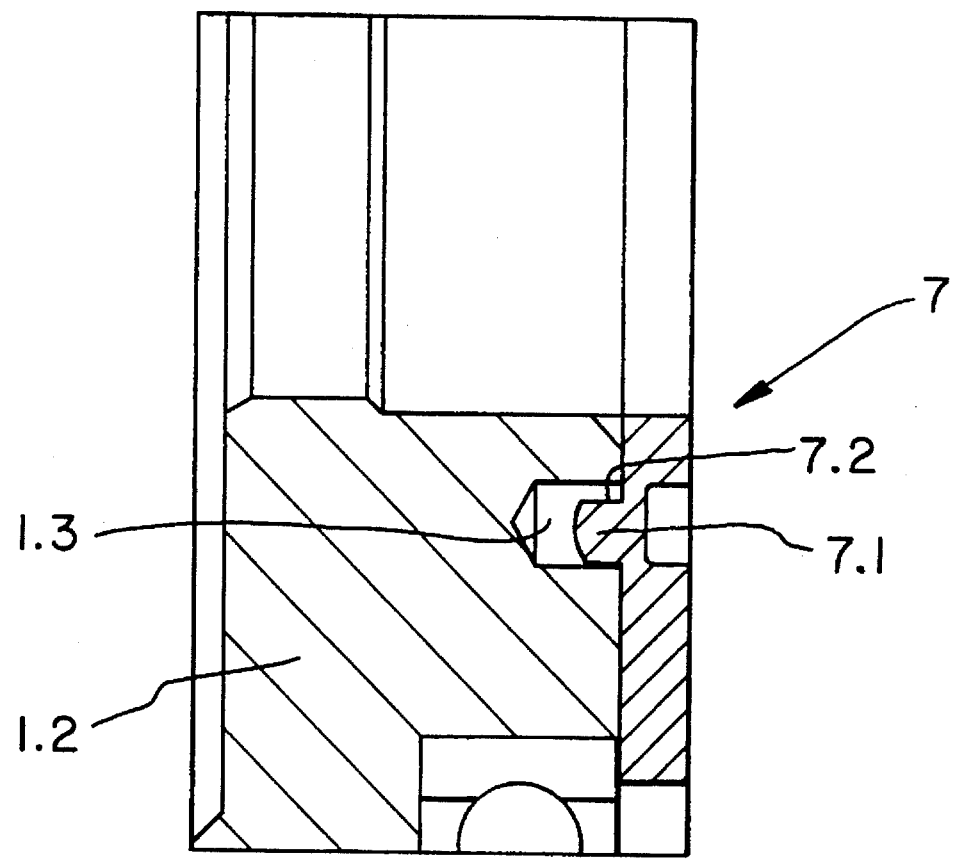
FIG. 4 shows an enlarged view of a section of FIG. 2, showing a flat surface if pin 7.1.

The holder disk is inventionally secured to the hub 1.2 of the primary mass 1 in the following manner. The primary mass 1 at end face 1.6 features two blind holes 1.3, 1.4. The holder disk 7, features two corresponding pins 7.1, which by so-called part shearing have been driven out of the material of holder disk 7 and pinch-fitted into the blind holes 1.3, 1.4. The two holes 1.3, 1.4 of the primary mass 1 are situated on different radii. In addition, they are not arranged diametrically opposed. The respective pins 7.1 of the holder disk 7, of which only one can be seen in FIG. 2, are arranged appropriately aligned on the holes 1.3, 1.4. According to the embodiment shown in FIGS. 2 and 4, pin 7.1 includes flattened surface 7.2 to provide a vent between the interior of the blind hole and the surroundings. This assures a fail-safe assembly.

As known to one skilled in the art, the double-counterpoised flywheel includes further necessary components. For example, there is a damping system provided, in the form of filled spaces 10.1, 10.2. The damping medium contained in the spaces is forced through narrow gaps 10.3, 10.4 in the mutual twisting of the two counterweights 1, 2, whereby the damping effect occurs.

Figure 3:
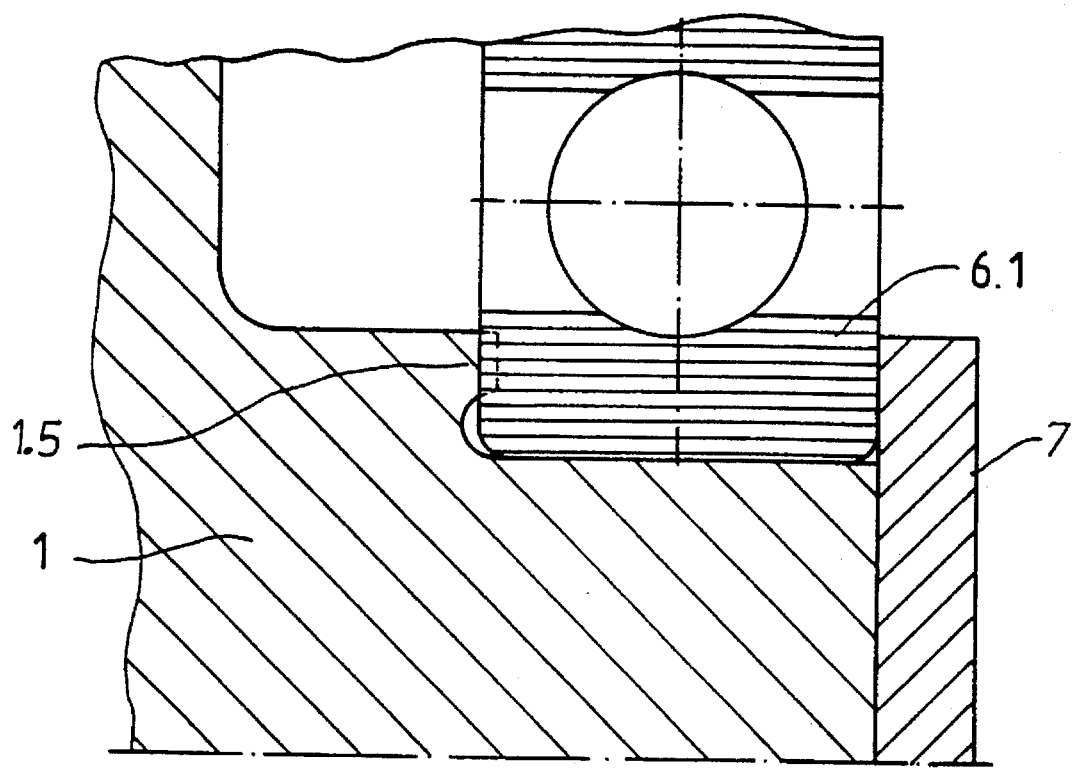
FIG. 3 is an enlarged view of a section of FIG. 2 showing the inner race and the holder disk.

FIG. 3 depicts the hub design of primary mass 1. The hub features an annular bead 1.5 on which bears the end face of inner race 6.1 of the bearing 6. In pinch-fitting the pins 7.1, the annular bead 1.5 is pressed into the corresponding holes 1.3, 1.4 in the primary mass 1, thereby reliably fixing the inner race 6.1 between primary mass 1 and holder disk 7.

Annular bead 1.5 need not have the exact configuration shown. For example, it need not necessarily be round, but could also be triangular, with a point of the bead pointing prior to pinch-fitting of the pins 7.1 of the holder disk 7 against the one end face of inner race 6.1.

What is claimed is:

1. A double-counterpoised flywheel for an internal combustion engine, said internal combustion engine having an engine side and a transmission side, comprising:

a first counterweight on the engine side of the internal combustion engine, said first counterweight comprising a primary mass having a stop face, and further comprising a hub having an end face;

a second counterweight on the transmission side of the internal combustion engine, said second counterweight comprising a secondary mass;

at least one elastic member for allowing limited mutual rotation of said counterweights;

a damping system arranged between said first and second counterweights, and parallel to the at least one elastic member;

an antifriction bearing arranged such that said counterweights bear on each other radially and axially through said antifriction bearing, said antifriction bearing having an inner race;

a holder disk, said holder disk secured to the end face on a power takeoff side; said inner race being mounted between the stop face of the primary mass and the holder disk, said holder disk comprising at least two pins, each of said pins comprising a driven-out portion of the disk, wherein each pin is driven outward toward the same side of the holder disk;

said hub end face including holes for receiving respective pins, said pins being configured for pinch-fitting into said holes.

2. The double-counterpoised flywheel of claim 1, wherein said holes are blind holes, and wherein a vent is provided between the interior of the blind holes and a surrounding area.

3. The double-counterpoised flywheel of claim 2, wherein said vents are created by molding to the pins flat surfaces that are parallel to the axes of said pins.

4. The double-counterpoised flywheel of claim 1, wherein the respective pin and hole arrangements are each arranged at a different radius of said hub end face and are mutually offset in relation to a diametrical line on said end face.

5. The double-counterpoised flywheel of claim 1, wherein the stop end of the primary mass further includes an annular bead.

6. A double-counterpoised flywheel for an internal combustion engine having an engine side and a transmission side, said internal combustion engine further having a first counterweight on the engine side of the internal combustion engine, said first counterweight comprising a primary mass having a stop face, and further comprising a hub having an end face; a second counterweight on the transmission side of the internal combustion engine, said second counterweight comprising a secondary mass; at least one elastic member for allowing limited mutual rotation of said counterweights; a damping system arranged between said first and second counterweights, and parallel to the at least one elastic member; an antifriction bearing arranged such that said counterweights bear on each other radially and axially through said antifriction bearing, said antifriction bearing having an inner race, wherein the improvement comprises:

a holder disk secured to the end face on a power takeoff side; said inner race being mounted between the stop face of the primary mass and the holder disk, said holder disk comprising at least two pins, each of said pins comprising a driven-out portion of the disk, wherein each pin is driven outward toward the same side of the holder disk; and said hub end face including holes for receiving respective pins, said pins being configured for pinch-fitting into said holes.

* * * * *